Dec. 30, 1969 G. P. KURPIS ET AL 3,487,337

DISTRIBUTED CONSTANT TRANSVERSAL EQUALIZER

Filed Oct. 23, 1967 2 Sheets-Sheet 1

INVENTORS.
G. P. KURPIS
J. J. TAUB
BY
ATTORNEY

INVENTORS.
G.P. KURPIS
J.J. TAUB
BY [signature]
ATTORNEY.

United States Patent Office 3,487,337
Patented Dec. 30, 1969

3,487,337

DISTRIBUTED CONSTANT TRANSVERSAL EQUALIZER

Gediminas P. Kurpis, Queens Village, and Jesse J. Taub, Plainview, N.Y., assignors to Cutler-Hammer, Inc., Milwaukee, Wis., a corporation of Delaware Filed Oct. 23, 1967, Ser. No. 677,144
Int. Cl. H03h 5/00, 7/10; H01p 5/14
U.S. Cl. 333—28 5 Claims

ABSTRACT OF THE DISCLOSURE

Distributed constant transmission line apparatus that simultaneously, and independently if desired, equalizes amplitude and phase distortion on a main transmission line. A sample of the signal on the main transmission line is coupled into an equalization loop by broadband adjustable directional coupling means that introduces negligible distortion onto the main line. The sample is reinserted onto the main transmission line by another broadband adjustable directional coupling means at a time which is substantially coincident with the occurrence on the main transmission line of a distortion echo that is time-displaced from the main signal. The magnitude and phase of the sample is controlled to substantially cancel the distortion echo, thus leaving only the undistorted signal on the main transmission line.

BACKGROUND OF THE INVENTION

Field of the invention

The invention relates to an electromagnetic wave equalization system in which the desired main signal has associated therewith undesired distortion echoes, or distortion sidelobes, which are time-displaced from the main signal, and more particularly it relates to relatively simple and reliable distributed constant transmission line means for eliminating the undesired time-displaced distortion echoes in a microwave system.

Description of prior art

In an article by H. A. Wheeler published in the June 1939 Proceedings of the IRE, pages 359–385, entitled "The Interpretation of Amplitude and Phase Distortion in Terms of Paired Echoes," the author discloses that the amplitude and phase response characteristics of an electrical circuit may be determined by examining the response of the circuit to an input pulse. The article teaches that if the circuit introduces amplitude distortion only, the output, when examined in the time domain, contains a main pulse corresponding to the input pulse plus at least one pair of smaller pulses, both of the same polarity, one preceding the main pulse and one following. If the circuit introduces phase distortion only, the output contains the main pulse plus at least one pair of smaller pulses of opposite polarities, one leading and one lagging the main output pulse. The author refers to these distortion pulses as "paired echoes." Subsequently, other authors have referred to the pairs of pulses as distortion sidelobes, because their appearance in an amplitude-time display resembles the sidelobes of an antenna pattern. If the circuit introduces both amplitude and phase distortion, the respective pairs of echoes are superimposed. Those on one side of the signal may cancel while those on the other side may add. The output signal of an electrical circuit may contain many pairs of the above-described echoes. The echo amplitudes are proportional to the amount of distortion, and their time displacement from the main output pulse is proportional to the number of peaks and valleys in the actual distortion signals.

Studies of the type described above have led to the development of a class of filters, or equalizers, known as transversal equalizers which have found use in television, high-speed pulse data transmission, and other communication systems having high requirements on fidelity of signal transmission and reproduction. So far as is known, the prior work with transversal equalizers has been done at relatively low frequency ranges, i.e., at HF and VHF frequencies in the I.F. portion of a communication system, where the techniques and circuitry employed are the lumped constant type.

In an article entitled "Experimental Transversal Equalizer for TD–2 Radio Relay System," by Bellows and Graham, appearing in the November 1957 issue of Bell System Technical Journal, pages 1429–1450, the authors disclose a transversal equalizer for use in the I.F. stage of a long distance communication system in which directional couplers having fixed coupling values are used for coupling the main signal from a coaxial cable transmission line and for coupling samples of the main signal at various locations on the coaxial line that precede and follow the location where the main signal is coupled therefrom. To achieve distortion echo cancellation, all of the coupled signals are combined in a summing circuit comprised of lumped constant circuit elements and vacuum tubes. Each of the samples of the main signal have a certain time of occurrence, a certain amplitude, and the correct polarity to cancel a respective distortion echo associated with the main signal. The correct timing for the samples is obtained by locating the sampling directional couplers along the coaxial line at positions which take into account the relative propagation times. The required amplitude and polarity of a sample is achieved by terminating one output terminal of the sampling directional coupler in a substantially pure resistance element whose value of resistance is variable. By properly selecting the resistance value to produce a desired reflection coefficient, substantially any magnitude and either polarity of the sample may be produced at another output terminal, as is explained in the reference.

Although apparatus of the type described above is useful at HF and VHF frequencies, it cannot be directly adapted for use at microwave frequencies because the lumped constant pure resistances that are used at the lower frequencies are unobtainable at microwave frequencies. Conventional microwave attenuators also introduce a phase delay and this delay changes as the attenuation is changed. Quite precise and accurate independent control of amplitude and phase distortions are required to produce a commercially acceptable microwave transversal equalizer. It previously has been thought impossible to build a microwave transversal equalizer because it was believed that the microwave components that would be required would themselves introduce reflections and produce amplitude and phase distortions to such an extent that the very precise control required would be unobtainable. It therefore has been the practice to heterodyne a microwave signal down to a lower frequency I.F. signal and utilized a transversal equalizer comprised of lumped constant circuit elements.

In some instances it is disadvantageous to heterodyne a microwave signal down to an I.F. frequency. For example, it would be less expensive and would considerably simplify the equipment of a microwave relay station if the signal could be equalized directly at microwave frequencies and then amplified by microwave amplifier such as a traveling wave tube. Furthermore, the distortion in some microwave systems is at the microwave excitation frequencies and is caused solely by microwave components, and it sometimes is extremely difficult to eliminate such distortions after heterodyning the signals down to a lower frequency range. This is particularly true in a frequency modulated system in which the local oscillator signal is sweeping in frequency.

SUMMARY OF THE INVENTION

In one embodiment of the present invention, the tranversal equalizer, which is formed of distributed constant transmission line elements, is comprised of a length of TEM mode strip transmission line which propogates the main microwave signal that has associated therewith a plurality of leading and lagging distortion echoes. A signal delay means is located in the length of transmission line to produce a given amount of real time delay. Preceding the delay means on the transmission line are a plurality of strip transmission line directional couplers whose coupling values may be adjusted to couple samples of selected magnitudes of the main signal that is propagating on the strip transmission line. The number of directional couplers is equal to the number of distortion echoes that are to be cancelled. A plurality of 3 db directional couplers are respectively coupled to the adjustable directional couplers. The two output terminals of each 3 db coupler, i.e., the terminals that receive signals that are directionally coupled in the preferred directions, are provided with terminating means which will establish at said terminals either open circuit or short circuit terminations. A signal coupled into a 3 db coupler will be reflected from the terminated output terminals and will propagate from the output terminal that normally represents the nonpreferred direction of coupling. The carrier phase of the sampled signal may be changed by 180° by changing the terminations of the normally preferred outputs from short circuits to open circuits, or vice versa. The sampled signal from each 3 db directional coupler then is passed through a respective delay means and then to a respective one of a second plurality of adjustable directional couplers that are located on the main strip transmission line at a location that is further along in the direction of signal propagation than the delay means therein, thereby to reinsert the plurality of sampled signals back onto the main transmission line. The time delay introduced in a sampled signal before its reinsertion onto the main transmission line so proportioned with respect to the propagation time of a selected distortion echo which has propagated directly along the main transmission line that the sampled signal and the selected directly propagating distortion echo occur substantially simultaneously at the output of the second adjustable directional coupler. The magnitude of the sampled signal is made equal to the magnitude of its respective directly propagating distortion echo by adjustments of the two adjustable directional couplers, and the carrier phase of the sampled signal is established by the adjustable terminations of the 3 db directional coupler so that the directly propagating distortion echo is substantially cancelled by the sampled signal. A plurality of sampling loops are establisehd in this fashion so that a corresponding plurality of distortion echoes are cancelled on the main transmission line. The combinations of directional couplers provides both envelope amplitude control and carrier phase control of the sampled microwave signals. Because directional couplers, including adjustable coupling directional couplers, can be made to operate over wide microwave bandwidths without introducing significant amplitude or phase distortion themselves, a microwave transversal equalizer comprised of distributed constant transmisseion line elements thus has been found to be feasible.

BRIEF DESCRIPTION OF THE DRAWINGS

The present invention will be described by referring to the accompanying drawings wherein.

DESCRIPTION OF THE PREFERRED EMBODIMENTS

Figure 1:
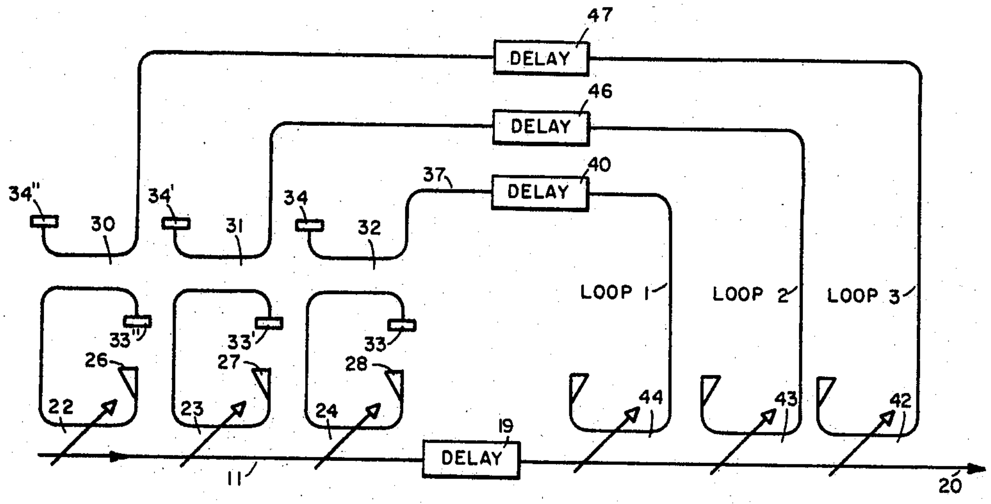
FIG. 1 is a simplified illustration of a microwave transversal equalizer constructed in accordance with the teachings of the present invention.
Figure 2:
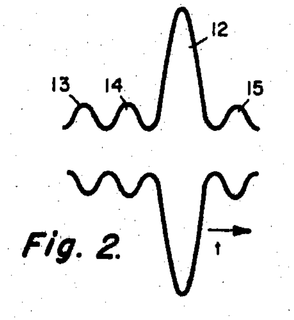
FIGS. 2 and 3 are simplified illustrations that are used in describing the nature of distortion echoes accompanying a microwave pulse.

Referring now in detail to FIG. 1, a microwave signal having both amplitude and phase distortion is coupled to a main transmission line 11, which in this illustrated embodiment is intended to be a line such as a strip transmission line that propagates electromagnetic waves in a TEM mode. It will be assumed that the main signal on transmission line 11 is a microwave pulse 12, FIG. 2, and that the amplitude and phase distortions are manifested on the amplitude-time plot by a plurality of distortion echoes 13, 14, 15 which precede and follow the main pulse 12. In practice, the relative magnitude of the main pulse 12 would be much greater than illustrated, and most likely there would be more distortion echoes than illustrated in the simplified sketch of FIG. 2.

Figure 3:
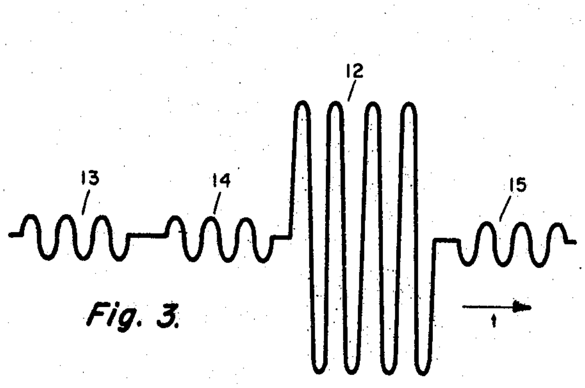

The phase of the microwave carriers within the distortion echoes may be the same as or different from that of the main pulse 12. For example FIG. 3 is a simplified representation of the carrier phases within the envelopes 12–15 of FIG. 2 and illustrates that the first carrier half-cycle of the main pulse 12 is in the positive direction, as are those of the leading distortion echoes 13 and 14, while the first carrier half-cycle of the lagging distortion echo 15 commences in the negative direction. The phase of the carrier in a distortion echo may be any random phase depending upon the nature of the amplitude and/or phase distortion which gives rise to the particular distortion echo.

The main pulse 12 and distortion echoes 13–15 propagate along the main transmission line 11, and all experience the same real-time delay in delay means 19 before arriving at the output end 20. Delay means 19 may be an extended length of line or cable which introduces minimum amplitude and phase distortion.

The signals propagating on main transmission line 11 are sampled by the directional couplers 22, 23, and 24 which are broadband strip transmission line couplers whose coupling values may be adjusted to select desired magnitudes of the samples of main pulse 12. As an example, directional couplers 22–24 may be adjusted to provide coupling values within the range of 10 to 25 db. As is known, the coupling value of a strip transmission line directional coupler may be changed by changing the spacing between the primary and secondary lines of the coupler, or by changing the characteristic impedance of the lines in the coupling region, such as by changing the separation between the ground planes in the coupling region.

It has been found that the adjustments of couplers 22–24 to different coupling values does not introduce intolerable phase and amplitude distortion of signals propagating on the main transmission line 11 as might have been suspected. This is because the sampled signals that are coupled are relatively small in magnitude so that directional couplers 22–24 provide rather "loose" coupling to the main transmission line 11, and any discontinuity, introduced because of the adjustment of the couplers 22–24 gives rise only to negligible distortion of signals on the main transmission line. However, should distortion be introduced on the main transmission line by the adjustable directional couplers of one equalization loop, another equalization loop may be adjusted to substantially reduce the distortion. This would be quite convenient in an operating system because many distortion echoes commonly are present and as many as one hundred equalization loops might be used. Consequently, distortion echoes that might be introduced by microwave components of an equalization loop will overlap other distortion echoes that may be present on the main transmission line and adjustments of the various equalization loops can effectively reduce the distortion echoes, irrespective of their source.

Directional couplers 22–24 are provided with respective non-reflecting terminations 26–28 which prevent reflections of energy coupled in the nonpreferred directions in the couplers. The secondary line of each of the adjustable directional couplers 22–24 is connected to an input terminal of a respective one of the 3 db directional couplers 30, 31, and 32. 3 db couplers 30–32 are adjustable polarity inverters that provide means for reversing the carrier phase of the respective sampled microwave signals. Considering coupler 32 as an example, the two output terminals that normally receive signals that are coupled in the preferred directions are terminated by the means 33 and 34 each of which can present either an open circuit or a short circuit termination. If terminations 33 and 34 are both adjusted to present short circuits, a signal entering the coupler 32 is evenly split in the coupler, is reflected from the terminations 33 and 34, is recombined by the coupler and propagates on line 37 with a certain carrier phase which is displaced by 180° from what it would have been had the terminations 33 and 34 been adjusted to present open circuits. It has been found that both open circuit and short circuit terminations on a 3 db directional coupler made of TEM mode transmission lines produce very small distortions over a broad microwave frequency range and are quite satisfactory for use in the microwave transversal equalizer.

The sample of the main pulse that is propagating on transmission line 37 next passes through a delay means 40 which may be a long length of cable, and then is coupled to a second adjustable directional coupler 44 which may be substantially identical to the adjustable directional couplers 22–24. Coupler 44 functions to couple a portion of the sample of the main pulse back onto the main transmission line 11.

Figure 5:
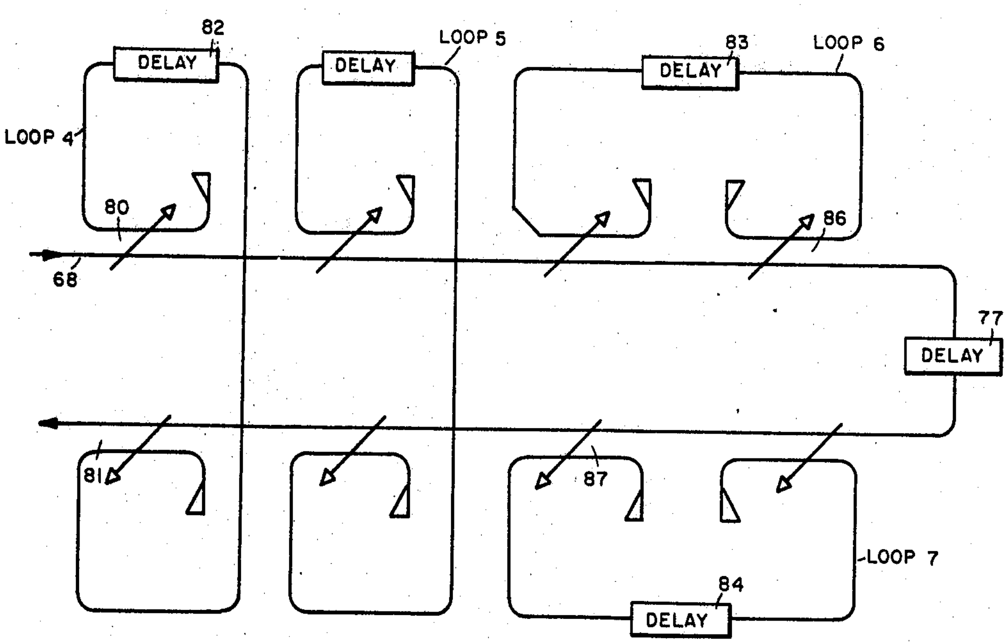
FIG. 5 is a simplified illustration of an alternative embodiment of the microwave transversal equalizer of this invention.
Figure 4:
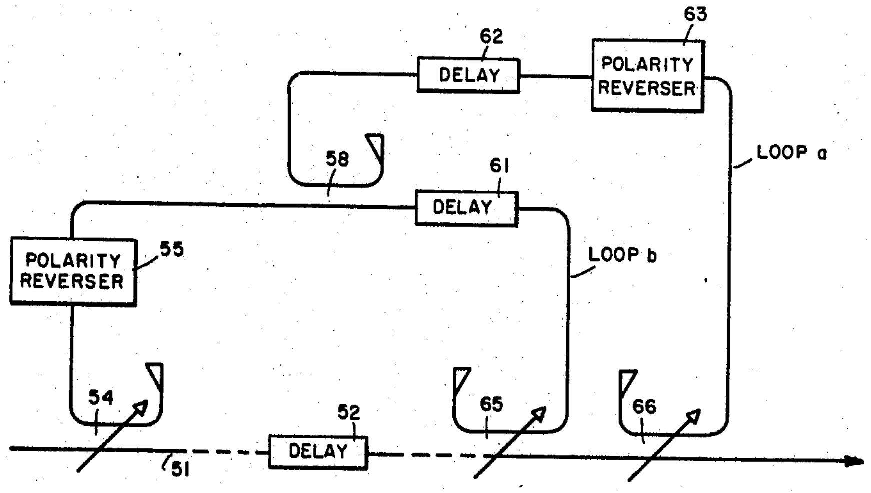
FIG. 4 is a simplified illustration of an alternative arrangement of an equalizer loop constructed in accordance with the teachings of this invention.

The directional couplers illustrated in FIG. 1, and later in FIGS. 4 and 5, are intended to represent strip transmission line couplers which are "backward firing." That is, they couple energy onto the secondary line of the coupler in the direction opposite to the propagation of energy on the primary line.

The samples of the main pulse that are propagating in the equalization loops must be coupled onto main transmission line 11 to propagate in the same direction as the distortion echo on the main line. For this reason, the connectors to and from directional couplers 42–44 are reversed from those of directional couplers 22–24.

Apparatus described above forms an equalizer loop 1 whose parameters are adjusted to achieve substantially complete cancellation of a selected one of the distortion echoes, such as echo 13. The delay means 19 in the main transmission line 11 and the delay means 40 in equalizer loop 1 are adjusted so that the envelope of the sample of the main pulse 12 that propagates in the loop is reinserted onto main line 11 at substantially the same instant of time that the envelope of distortion echo 13 appears at adjustable directional coupler 44 after having propagated directly along main transmission line 11 and through delay means 19. The coupling values of adjustable directional couplers 24 and 44 are adjusted so that the two envelopes are equal in magnitude, and the proper type of terminations are selected at terminations 33 and 34 on 3 db coupler 32 so that the carrier of the reinserted sample is substantially 180° out of phase with the carrier of distortion echo 13, thereby effecting substantially complete cancellations. In adjusting the carrier phase of the sample of the main pulse in equalizer loop 1 it should be remembered that each of the adjustable directional couplers will introduce a 90° carrier phase shift to the coupled energy, so that the two adjustable couplers inherently introduce a 180° carrier phase shift to the sampled signal propagating in loop 1. The delay means 19 and 40 each may include a trombone section, i.e., a section of transmission line of adjustable length, for achieving fine adjustment of the total delays in equalizer loop 1 and on the main transmission line.

Equalizer loop 2 includes adjustable directional couplers 23 and 43, 3 db directional coupler 31 with its adjustable terminations 33' and 34', and delay means 46. Equalizer loop 3 includes adjustable directional couplers 22 and 42, 3 db directional coupler 30 with its adjustable terminations 33'' and 34'', and delay means 47. In the manner described above in connection with loop 1, loop 2 may be adjusted to achieve substantially complete cancellation of distortion echo 14 at adjustable directional coupler 43, and loop 3 may be adjusted to substantially completely cancel the lagging distortion echo 15 at adjustable directional coupler 42. It is obvious that because distortion echoes 13 and 14 are leading the main pulse 12, FIG. 2, the delays experienced by the distortion echoes 13 and 14 propagating directly along the main transmission 11 must be greater than the respective delays experienced by the samples of the main pulse that are propagating in loops 1 and 2. On the other hand, because distortion echo 15 is lagging the main pulse 12, the delay experienced by the sample of the main pulse propagating in loop 3 must be greater than the delay experienced by distortion echo 15 propagating directly through main transmission line 11.

Referring to FIG. 3 it will be seen that the carrier phase of the lagging distortion echo 15 is illustrated as being opposite to that of the leading distortion echoes 13 and 14. Because of this, the type of terminations on 3 db directional coupler 30 will be opposite that on 3 db directional coupler 31 and 32. Assuming terminations 33, 34, and 33', 34' present open circuits, terminations 33'' and 34'' would be adjusted to present short circuits.

In addition to coupling a sample of the main pulse 12 into the equalization loops, the adjustable directional couplers 22–24 also will couple samples of the distortion echoes 13–15 into the loops. Samples of these distortion echoes will have no adverse effect on equalization operation when they are reinserted onto the main transmission line 11 at adjustable directional couplers 42–44 because the distortion echoes are considerably smaller in magnitude than the main pulse 12 and after having been attenuated in passing through two adjustable directional couplers, each of which couples to its output only a small sample of its input, their magnitudes are so small that for all practical purposes they may be neglected. If, for example, a distortion echo on the main transmission line were 30 db lower in magnitude than the main pulse at the output of the equalizer, and the two adjustable directional couplers of the equalization loop each were adjusted to a coupling value of 15 db, a sample of a distortion echo would be reduced to at least 60 db below the main pulse by the time it was reinserted onto the main transmission line.

The arrangement and operation of equalizer loops of the type illustrated in FIG. 1 will in most instances satisfactorily cancel a distortion echo. If, however, substantially complete carrier cycle cancellation cannot be achieved, the alternative arrangement of an equalizer loop illustrated in FIG. 4 may be employed. In this figure, the main transmission line 51 and delay means 52 correspond to the main transmission line 11 and delay means 19 of FIG. 1. This alternative arrangement also includes an adjustable directional coupler 54 and polarity reverser 55 of the same type that previously was described in connection with FIG. 1. The sample of the main pulse which is coupled onto the equalizer loop by adjustable directional coupler 54 commences propagating around the loop and encounters directional coupler 58 which may be fixed or adjustable and which produces a power split of the sampled pulse propagating within the loop.

A first portion of the sampled pulse propagates along the primary line of the coupler to a delay means 61, and a second portion which is coupled through coupler 58 propagates to delay means 62. This second portion of the sampled main pulse then is coupled through a polarity reverser 63 which is similar to those previously described. Both portions of the sampled main pulse then are reinserted onto the main transmission line 51 by means of the respective adjustable directional couplers 65 and 66. It will be recalled that the power coupled from the secondary arm of a directional coupler is 90° out of phase with the energy coupled from the primary line of the directional coupler. By controlling the magntiude and polarity of the quadrature components and then combining the components, a resultant signal of substantially any carrier phase effectively may be obtained. The vector addition effect may be accomplished by controlling the relative magnitudes of the two components by the adjustment of adjustable directional couplers 65 and 66, and the quadrant within which the resultant vector will fall may be controlled by the polarity reversers 55 and 63. The relative delays introduced by delay means 61 and 62 are adjusted so that the sampled components are reintroduced onto the main transmission line 51 at the proper times to produce the effect of a vector addition that cancels the distortion echo on the main transmission line.

Figure 6:
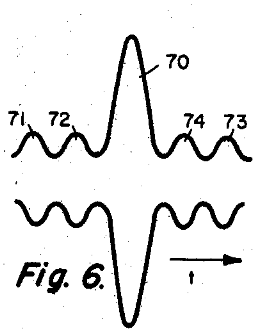
FIGS. 6 and 7 are simplified illustrations of waveforms used in explaining the operation of the transversal equalizer illustrated in FIG. 5.
Figures 7A, 7B, 7C:
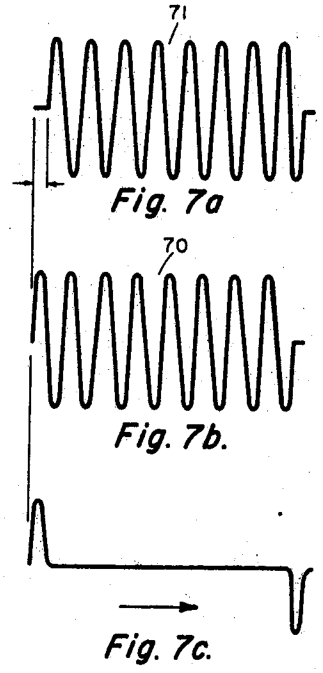

In some microwave systems it may not be necessary to achieve complete cancellation of distortion echoes since the performance of the system may be considered to be satisfactory so long as the magnitudes of the distortion echoes do not exceed some acceptable magnitude. In such instances, the equalization loops may be somewhat simplified from those that are shown in FIG. 1. For example, in FIG. 5, the main transmission line 68 propagates a microwave signal comprised of a main pulse 70, FIG. 6, which has associated therewith two leading distortion echoes 71 and 72 and two lagging distortion echoes 73 and 74. The main transmission line 68 is illustrated as being bent into a U-shape and has a delay means 77 disposed therein to introduce a real-time delay to the signals propagating on the line. Four equalization loops 4–7 are provided. Loop 4 includes the adjustable directional coupler 80 which couples a sample of the main pulse 70, and a second directional coupler 81 reinserts the sample of the main pulse onto the main transmission line 68. A delay means 82 is the only other component in the equalization loop. The delay means 82 will include some means for providing adjustment in the delay time so that the envelope of the sample that is propagating in eqalization loop 4 may be slightly advanced or delayed with respect to some fixed delay. Assuming that equalization loop 4 is intended to substantially cancel the leading distortion echo 71, the delay provided in the main transmission line 68 by the delay means 77 will be made greater than the delay provided by delay means 82 in equalization loop 4 so that when the sample of the main pulse 70 is reintroduced onto the main transmission line 68 at the adjustable directional coupler 81 it will be in substantial time coincidence with the leading distortion echo 71. Because the carrier phase of the distortion echo 71 may be of any random phase relative to the carrier of the sampled main pulse in equalization loop 4, complete carrier cancelling may not necessarily occur if the two envelopes are in exect time coincidence. No carrier phase adjustment means are included in equalization loop 4, yet it is possible to obtain substantial cancellation by slightly changing the time delay that is experienced by the sampled main pulse propagating in equalization loop 4. This may be seen by referring to FIG. 7 which illustrates the worst possible case for achieving optimum carrier cancellation, this case occuring when the sample of the main pulse in equalization loop 4 has substantially the same carrier phase as the distortion echo that is propagating directly through main transmission line 68. Assuming that the carrier waveform of FIG. 7*a* represents the distortion echo 71 and that the carrier waveform of FIG. 7*b* represents the sample of the main pulse that is reintroduced onto the main transmission line at the adjustable directional coupler 81, optimum carrier cancellation may be achieved by adjusting delay means 82 so that the envelope of the main pulse sample is coupled onto the main transmission line 68 a fraction of a carrier wavelength prior to the commencement of the distortion echo 71. In FIG. 7 the sample of the main pulse, FIG. 7*b* is illustrated as commencing approximately a half wavelength prior to the commencement of the envelope of the distortion echo 71. By comparing the waveforms 7*a* and 7*b* at a plurality of instances of time throughout their durations, it will be seen that when the carrier of waveform 7*a* is at a maximum the carrier of waveform 7*b* is at a minimum, except for the leading one-half cycle of waveform 7*b* and the concluding one-half cycle of waveform 7*a*. Therefore, when these two waveforms are combined at adjustable directional coupler 81, the major portions of these waveforms will substantially cancel, leaving uncancelled only the leading and concluding half cycles of the waveforms, as illustrated in FIG. 7*c*. Although the cancellation is not complete, the energy content of the uncancelled leading and trailing half cycles is very low so that very little actual distortion remains. It has been found in practice that acceptable equalization can be achieved in some systems with the simplified equalization loop illustrated in FIG. 5.

Equalization loop 5 may be adjusted in a manner similar to that just described to provide optimum cancellation of the second leading distortion echo 72.

The two lagging distortion echoes 73 and 74 may be reduced to acceptable levels by the respective equalization loops 6 and 7. Because distortion echoes 73 and 74 are lagging the main pulse 70, the equalization loops 6 and 7 need not span the delay means 77 in the main transmission line 68. The delay means 83 and 84 in equalization loops 6 and 7 are adjusted to provide respective delays approximately equal to the time-displacement of the distortion echoes 73 and 74 from the main pulse 70 so that when samples of the main pulse that are progagating within the equalization loops 6 and 7 are reintroduced onto the main transmission line 68 by the respective adjustable couplers 86 and 87, optimum cancellation of the distortion echoes will be accomplished. All of the delay means illustrated in FIG. 5 include some adjustment means such as a trombone section so that the envelopes of the samples in the equalization loops may be displaced slightly with respect to the envelopes of the distortion echoes that are to be cancelled on the main transmission line 68.

In the initial adjustment of the equalizer loops to achieve the desired cancellations, it first may be helpful to determine theoretically the approximate times of occurrence and the carrier phases of the distortion echoes. On the basis of the theoretical determination, the parameters of the equalization loops may be set and the output of the main transmission line then may be viewed on an oscilloscope which provides an amplitude vs. time presentation of the output. The fine adjustment of the parameters in the equalization loops then may be made while viewing the oscilloscope presentation to achieve the desired degree of distortion cancellation. One of the advantageous features of the transversal equalizer of this invention is that absolutely no prior knowledge of the nature of the distortion is necessary. The output of the main transmission line may be viewed on the oscilloscope and all adjustments to the parameters of the equalization loops may be made until desired cancellation is evidenced on the oscilloscope.

In some microwave systems it may not be required, or may not be desired, that both amplitude and phase distortions be cancelled. In such a situation, the characteristics of the type of distortion to be cancelled may be determined theoretically and the equalization loops then adjusted accordingly. Alternatively, a test signal having distortion echoes evidencing only phase or ampiltude distortion of the type to be cancelled may be coupled to the main transmission line and the equalization loops adjusted to cancel the distortion echoes resulting only from the one type of distortion.

In the above-described, the transmission lines and components were described as being the strip transmission line type. The invention may be practiced with other types of transmission lines such as coaxial lines, slab lines, or hollow waveguides. If hollow waveguides were employed, the polarity inverters 30–32 of FIG. 1 would have terminations 33 and 34 in the form of a short circuited termination with a removable short placed one-quarter wavelength in front thereof.

FIGS. 1, 4, and 5 all show that the coupled sample of the main pulse in an equalization loop is reintroduced onto the main transmission line at a region further along in the direction of propagation than the region at which it was coupled from the main transmission line. In situations where a lagging distortion echo is to be cancelled, it is possible to couple the sample of the main pulse in the equalization loop onto the main transmission at a region that precedes the region from which it was coupled.

What is claimed is:

1. A distributed constant transversal equalizer, comprising means providing a main transmission path, means providing a branch transmission path, means for coupling one end of said branch transmission path to a first region on said main transmission path, and means for coupling the other end of said branch transmission path to a second region on said main transmission path, at least one of said coupling means being a directional coupler terminated to prevent reflection of energy coupled in the nonpreferred direction, the coupling coefficient of said directional coupler being adjustable to vary the attenuation of a sample signal transferred through said coupling means with substantially no variation in phase shift, the transmission delay of said branch transmission path being related to that between said first and second regions on said main transmission path to provide a selected time relationship between a signal transmitted directly along said main transmission path and the attenuated sample thereof transferred to said main transmission path at said second region.

2. The invention set forth in claim 1, wherein said branch transmission path further includes polarity selector means comprising a four port 3 db directional coupler with two of its ports totally reflectively terminated in open or short circuits.

3. The invention set forth in claim 1, wherein the attenuation between said main and branch transmission paths is adjusted in accordance with the amplitude of a desired signal with respect to that of an undesired echo thereof to equalize the amplitude of the attenuated sample of said desired signal with that of the unattenuated undesired echo signal that is transmitted directly along said main transmission path, and the transmission delay of said branch transmission path is adjusted with respect to that of said main transmission path to provide substantial time coincidence between said attenuated sample signal and said unattenuated undesired echo signal.

4. The invention set forth in claim 3, wherein said branch transmission path is adjusted to provide substantially180° phase difference between said sample and echo signals at said second region on said main transmission path.

5. A distributed constant transversal equalizer, comprising a distributed constant main transmission line for propagating a main signal having associated therewith at least one time-displaced distortion echo, transmission line adjustable coupling directional coupling means for directionally coupling a sample of selectable magnitude of said main signal from a first region on the main transmission line, second transmission line adjustable coupling directional coupling means located on the main transmission line at a second region for reinserting onto said main transmission line a sample of selectable magnitude of the main signal, thereby to form an equalization loop, said second directional coupling means reinserting said sample of the main signal onto the main transmission line with a direction of propagation the same as that of the distortion echo, means located in said equalization loop for dividing said sample of the main signal to provide first and second portions, said first portion propagating to said second directional coupling means at said second region, third transmission line adjustable coupling directional coupling means located on said main transmission line at a third region that is displaced from said first region, means coupling the second portion of said sample to said third adjustable directional coupling means, and means controlling the relative propagation times of said two portions of the sample, said last-named means being adjusted so that the two portions of said sample are reintroduced onto said main transmission line to substantially cancel said distortion echo on said main transmission line.

References Cited

UNITED STATES PATENTS

| | | | |
|---|---|---|---|
| 2,560,806 | 7/1951 | Lewis | 178—44 |
| 3,372,350 | 3/1968 | Kawahashi et al. | 333—28 |

FOREIGN PATENTS

| | | |
|---|---|---|
| 842,794 | 7/1960 | Great Britain. |

HERMAN KARL SAALBACH, Primary Examiner

MARVIN NUSSBAUM, Assistant Examiner

U.S. Cl. X.R.

333—10, 70